Sept. 5, 1933.    M. J. HANSON    1,925,835
SYNCHRONOUS MOTOR DRIVE FOR CLOCK TRAINS
Filed Jan. 31, 1931    3 Sheets-Sheet 1
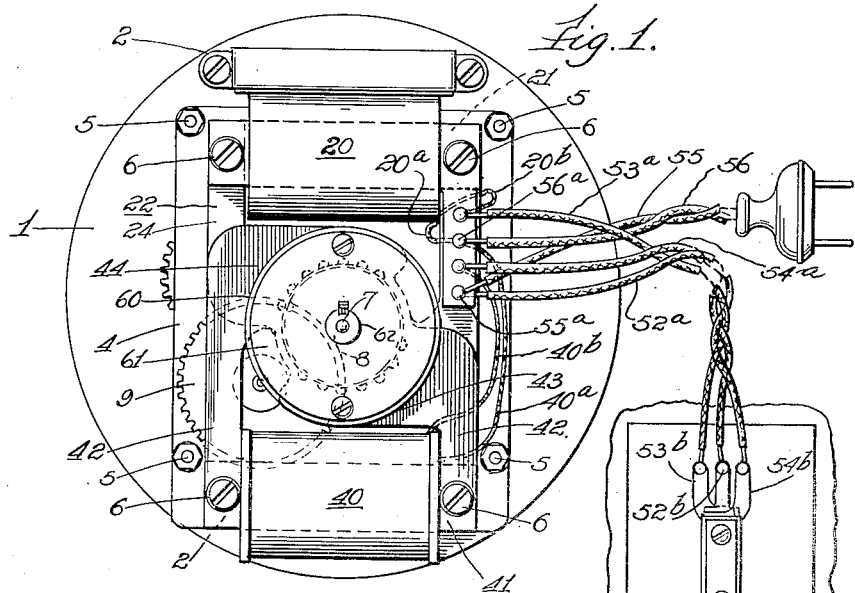
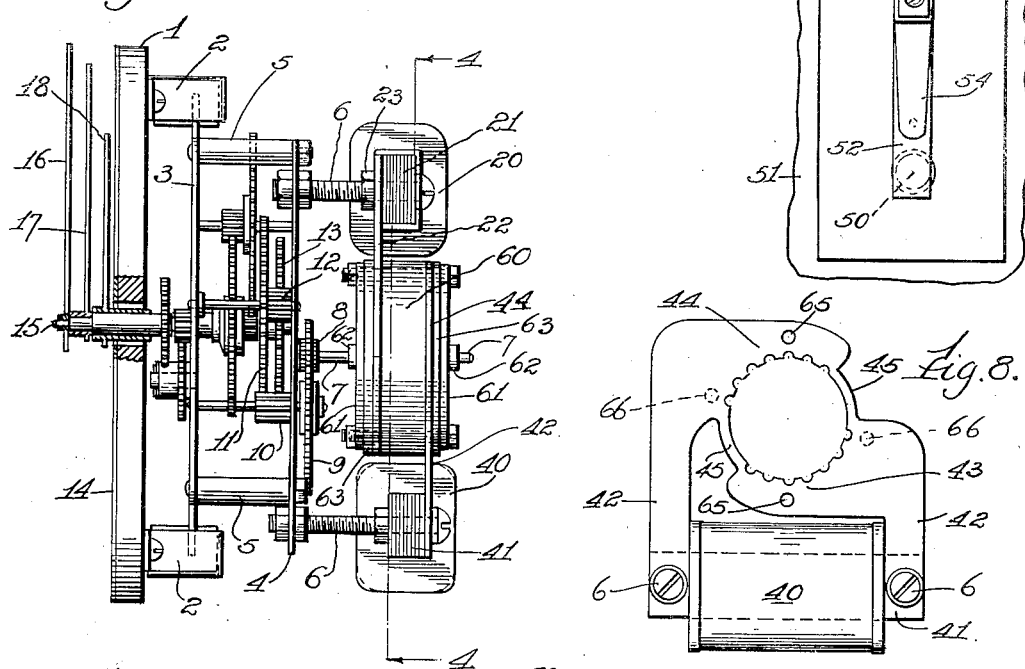
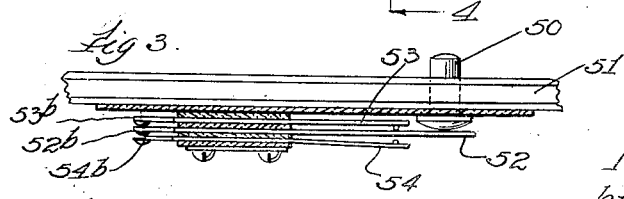
Inventor.
Martin J. Hanson
by his Attorneys Sept. 5, 1933.  M. J. HANSON  1,925,835
SYNCHRONOUS MOTOR DRIVE FOR CLOCK TRAINS
Filed Jan. 31, 1931  3 Sheets-Sheet 2
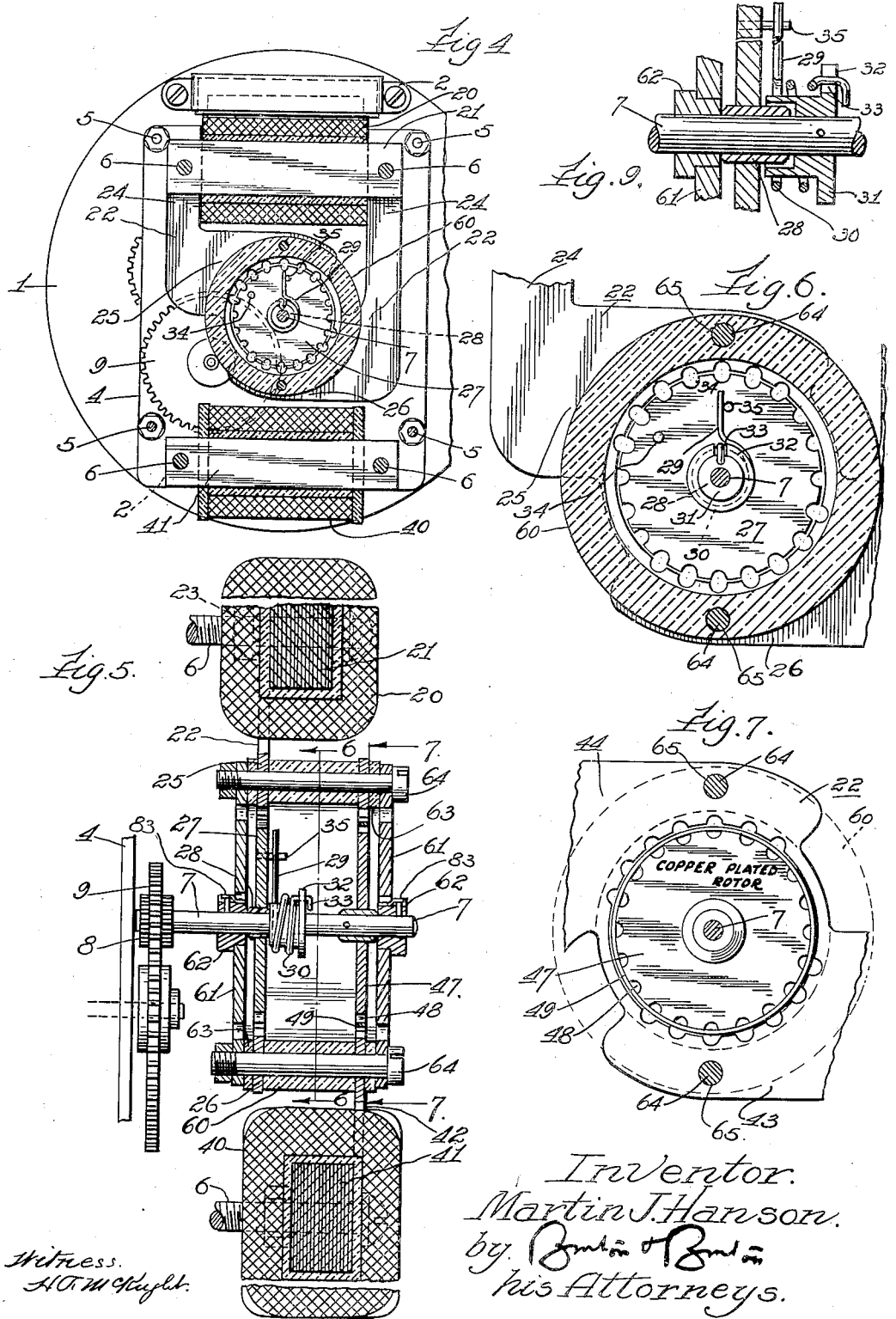

Sept. 5, 1933.  M. J. HANSON  1,925,835
SYNCHRONOUS MOTOR DRIVE FOR CLOCK TRAINS
Filed Jan. 31, 1931  3 Sheets-Sheet 3
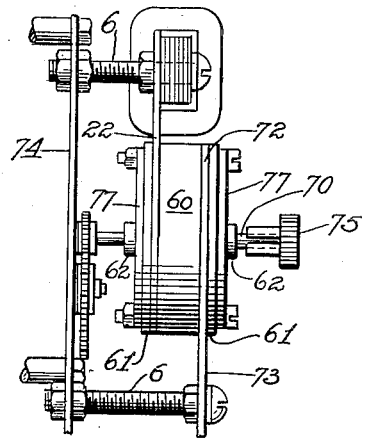
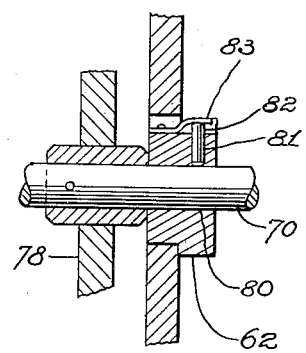
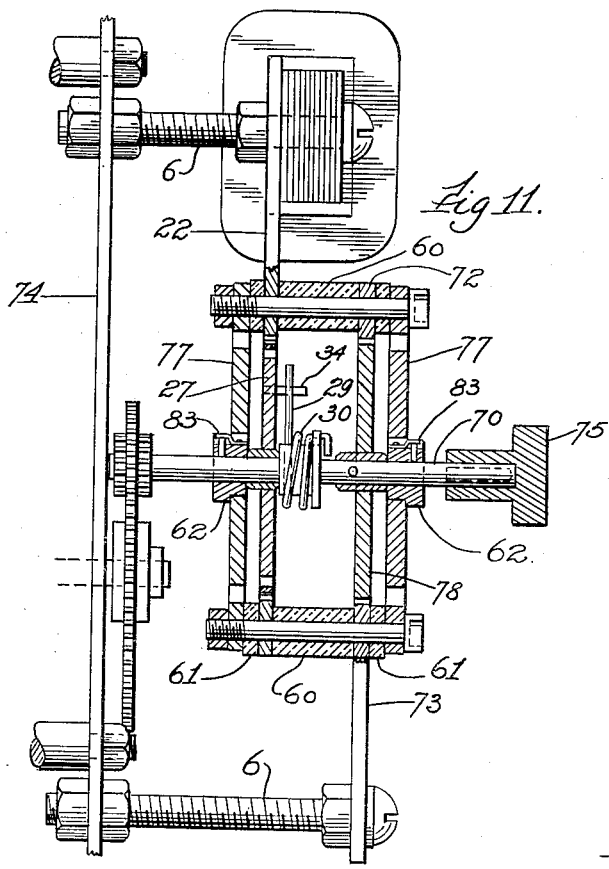

Patented Sept. 5, 1933

1,925,835

UNITED STATES PATENT OFFICE 1,925,835

SYNCHRONOUS MOTOR DRIVE FOR CLOCK TRAINS

Martin J. Hanson, Oak Park, Ill., assignor to Electra Corporation, Chicago, Ill., a corporation of Illinois Application January 31, 1931. Serial No. 512,521

12 Claims. (Cl. 172—275)

The purpose of this invention is to provide an improved type of electric motor especially designed to operate in synchronism with the alternations of the energizing current, and for purposes of illustration such a motor is shown arranged for driving a clock train,—it being assumed that for this purpose the alternations of the current are suitably controlled by a master mechanism at the power supply source. A special object of the invention is to provide convenient and dependable means for starting the motor and its load, and promptly bringing the motor into synchronism with the oscillations of the current supply, and another object is to insure that such starting means shall operate satisfactorily without requiring any special skill on the part of the operator. The invention, therefore, consists in the combination of certain features and elements as herein shown and described, and as indicated by the claims.

In the drawings:

Figure 1 is a rear elevation showing the dial portion of a clock case and an electric driving and starting motor mechanism as supported thereon in connection with the clock train, most of which is hidden by said motor.

Figure 2 is a side elevation partly in section, showing the clock dial and train and the electric driving motor.

Figure 3 is a detail section of the starting button and control switch.

Figure 4 is a vertical sectional view through the motor, taken as indicated at line 4—4 on Figure 2.

Figure 5 is an axial vertical section of the motor, taken substantially as indicated at line 5—5 on Figure 4, but showing the parts on a somewhat larger scale.

Figure 6 is an enlarged detail section taken as indicated at line 6—6 on Figure 5.

Figure 7 is an enlarged detail section taken as indicated at line 7—7 on Figure 5.

Figure 8 is a detail elevation of the coil and field plate for one portion of the motor.

Figure 9 is an enlarged detail section taken at the axis of the drive shaft and showing the mounting of the synchronous rotor in its relation to the driving spring.

Figure 10 is a side elevation of a modified motor unit omitting the self-starting motor and adapted to be manually started.

Figure 11 is an axial vertical section of the same on a somewhat larger scale.

Figure 12 is an axial detail section of a take-up bearing construction adapted for use in this motor.

Clock trains driven by synchronous motors are now commonly of two types; in one type the motor is provided with shading coils or other features which render it self-starting, so that when the current supply is switched on the motor will pick up speed and then continue to run at a definite speed in synchronism with the alternations of the current source. This is quite satisfactory unless there be an interruption of the current supply, in which event the clock driven by such motor will stop until the current supply is resumed. If the interruption be for a few minutes only, or should occur during the night time, it is quite likely to go unnoticed, but the clock thereafter will indicate the time incorrectly and thus becomes unreliable as a chronometer. In the other type the motor is of the synchronous class, but is not self-starting; hence, upon any interruption of the current supply the clock will stop and will not start again until it is voluntarily started, usually by manual means. This is often somewhat difficult and requires the operator to attain a certain skill in spinning the train at approximately the speed at which it is to be driven by the synchronous motor; otherwise the motor may fail to fall into step with the current alternations, and several attempts may re required before it is successfully launched.

The present invention provides a synchronous motor, which is not self-starting, as the means for continuously driving the clock train. But instead of relying upon manually operable starting mechanism it provides in addition a self-starting type of induction motor which is so designed as to drive the synchronous motor and the train at a slightly excessive speed for launching it, so that when the current supply is cut off from the self-starting motor the parts will slow down gradually and in passing through "synchronous" speed will fall into step with the current oscillations and continue to be operated by the synchronous motor thereafter. This involves a switching device which normally maintains intact the energizing circuit of the synchronous motor but which is operable to successively break said circuit and complete the circuit to the non-synchronous motor, and which, when released, automatically shifts the current supply from the self-starting motor to the synchronous motor. The invention also involves a resilient and a loose mechanical coupling between the rotors of the two motors to permit the rotor of the synchronous motor to fall into step with the current oscillations readily.

For purposes of illustration the drawings show a clock dial, 1, on the back side of which there is supported by suitable mounting lugs, 2, a clock train whose shafts are journaled in a frame consisting of a front plate, 3, and a back plate, 4, with spacer posts, 5, connecting them. The electric motor is carried by threaded studs, 6, standing out from the back plate, 4, and engaging the field plates of the motor itself. The clock train may be of any conventional type. It is shown as deriving its motion from the shaft, 7, of the electric motor by way of a pinion, 8, on the shaft meshing with a large gear, 9, whose pinion, 10, drives the gear, 11. Thence, motion is transmitted by the pinion, 12, associated with the gear, 11, to a gear, 13, centered at the axis of the dial, 14, and connected to the shaft, 15, which carries the second hand, 16, at its outer end. The continuous rotation of this hand serves as a visual indication that the clock is operating properly.

The minute hand, 17, and hour hand, 18, are suitably geared to the shaft, 15, at the proper ratios in the usual way.

The electric motor unit, as already noted, consists of two motors whose rotors are co-axially mounted on the shaft, 7. The synchronous motor consists of a field coil, 20, surrounding a laminated core, 21, which is secured in close contact with a field plate, 22, being clamped against it by nuts, 23, on the studs, 6. The field plate includes leg portions, 24, which are thus, magnetically considered, extensions of the laminated core, 21, and terminate in pole pieces, 25 and 26. These pole portions, instead of extending symmetrically from the leg portions, 24, are deflected laterally in opposite directions, so that one of them passes between the axis of the rotor or shaft, 7, and the field coil, 20, while the other extends adjacent the rotor at the other side of this axis. This feature of the design is not a part of the present invention, but it may be explained that it is instrumental in producing a rotary shifting of the poles of the field and causing rotation of the armature or rotor element.

The rotor of the synchronous motor is seen in Figure 4 as a disk, 27, having its periphery notched at uniform intervals for concentrating the magnetic flux, in a well understood manner,—the adjacent arcs of the polar portions of the field plate being correspondingly notched for this purpose. The rotor disk, 27, is carried on a central hub, 28, which is rotatably mounted on the shaft, 7, but the angle of its rotation thereon is yieldingly limited to a few degrees by virtue of an arm of spring wire, 29, extending radially from a coiled portion, 30, encircling a hub, 31, which is pinned fast to the shaft, 7, and in whose flange, 32, the end of the coil, 30, is anchored at 33. The radial portion, 29, of the spring wire extends between pins, 34 and 35, in the face of the rotor disk, 27, and these pins are spaced apart to permit limited play of the wire, 29, between them; the yielding nature of the wire, 29, and the length of the coil, 30, will permit a slight further shifting of the disk, 27, angularly with respect to the fixed hub, 31, on the shaft, 7.

The self-starting motor is quite similar in design to the synchronous motor, and for convenience in manufacture may employ a field coil, 40, with a laminated core, 41, and a field plate, all exactly similar to those of the synchronous motor. These parts are shown as a disassembled unit in Figure 8, which gives a clearer view of the outline of the field plate than any of the assembled views. The leg portions, 42, are of unequal length because one of them connects with the pole portion, 43, which extends between the core, 41, and the axis of the rotor, while the other pole portion, 44, occupies an arc at the opposite side of said axis and is thus farther removed from the core, 41. Mainly for convenience of manufacture and to insure accurate assembly, the pole portions, 43 and 44, are united by narrow necks of metal at 45, whereas the motor would be slightly more efficient if air gaps were provided at these points. The reduction of cross section of the metal at 45, however, results in a concentration of the flux at the poles, 43 and 44, and likewise in the poles, 25 and 26, of the synchronous motor which is sufficient for all practical purposes.

The rotor disk, 47, of the self-starting motor is shown with notches or apertures, 48, but the notched periphery thus formed is closed and rendered continuous by means of a tightly fitting tire member, 49, of magnetic material forced onto the disk, 47. The operation of the motor depends in part upon induced current traversing the surfaces of both the field plate and the rotor, these currents setting up a counter-flux which causes a lagging or retardation of the main flux in the pole pieces of the motor. In order to increase the efficiency of these surfaces as conductors, I prefer to electro-plate the soft steel of the rotor, 47, with copper. The notches or apertures, 48, having their edges thus copper-plated, serve to electrically connect the opposite faces of the disk, 47, providing suitable closed paths for the induced currents. Before application of the tire member, 49, the peripheral surface of the disk is buffed to remove the copper, thus insuring effective magnetic contact between the edge of the disk and its tire. The tire, 49, itself is not copper-plated, and spanning the notches, 48, as it does, it serves to minimize their effect in tending to hold the rotor, 47, to synchronous speed. The presence of the notches, 48, and the notched formation of the field plate, which is exactly similar to that of the synchronous motor, gives the non-synchronous motor a tendency to favor the synchronous speed, but does not prevent it from attaining higher speed or from operating with effective torque at lower speeds in getting the mechanism under way.

For controlling the supply of electrical energy to the dual motor unit just described I provide a switch button, 50, mounted in any convenient wall, 51, of the clock case, and in operative contact with a spring arm, 52. As shown in Figure 3, the arm, 52, is normally in electrical contact with the arm, 53, but upon depression of the button, 50, this contact is broken and a second contact is made between the arm, 52, and the arm, 54. The three arms, 52, 53 and 54, are insulated from each other, and each of them is provided with a suitable attachment lug for connection with flexible wires leading to the motor unit, as shown in Figure 1.

One of the main lead wires, 55, extends to a binding post, 55ª, and this same binding post is connected by a wire, 52ª, to the lug, 52ᵇ, of the arm, 52. The other lead wire, 56, extends to a binding post, 56ª, from which branched connections, 20ª and 40ª, lead to the respective field coils of the synchronous and non-synchronous motors. The return wires, 20ᵇ and 40ᵇ, lead to binding posts which connect them with conductors, 53ª and 54ª, respectively, and thence with the arms, 53 and 54, of the switch device. Thus in the normal position of the parts shown in Figure 3, the spring arm, 52, maintains contact with the arm, 53, and thus completes the circuit for energizing the synchronous motor field coil, 20. But for starting the motor the button, 50, is depressed, thus temporarily breaking the circuit of the coil, 20, but energizing the coil, 40, through the arm, 54, and its connecting wire, 54ª. A very brief interval of operation of the non-synchronous motor is sufficient to bring the parts up to speed, the spring arm, 29, being rotated by the shaft, 7, and itself driving the rotor disk, 27, by contact with one of the pins, 34, 35, thereon. As pressure on the button, 50, is released, the contact with arm, 54, is broken, but contact is made with arm, 53, thus switching the energizing current into the coil, 20, and subjecting the field plate, 24, 25, 26, to the action of the alternating current. The momentary spinning of the shaft, 7, and associated parts, by the rotor, 47, at something above "synchronous" speed and the subsequent cessation of the driving force, will permit these parts to slow down, passing through "synchronous" speed as they are retarded gradually by the friction of the bearings and the gear train. At this point the rotor, 27, will be periodically attracted by the pulsations of magnetic flux due to the alternating current flowing in the coil, 20, and if its notches do not exactly register with the notches of the field plate poles the play between pins, 34 and 35, as well as the yielding character of the arm, 29, will permit the disk to be jerked backward or forward slightly to bring about a more perfect registration, after which it will continue to rotate in synchronism and to drive the clock train through the spring arm, 29, and shaft, 7.

For convenience of construction the field plates of the two motors are spaced apart, preferably by a filler or annular wall, 60, of non-magnetic and non-conducting material, such as fiber or bakelite, with which there are associated the circular end plates, 61, which support bearing bushings, 62, for the shaft, 7. Spacer rings, 63, also of non-magnetic insulating material, are inserted between the field plates and the end plates, 61, and the whole assembly is bound together by tie bolts, 64, passing through holes, 65, in the field plates. As shown, these bolts, 64, are disposed in a strictly vertical diametral plane primarily for convenience of illustration; but in actual practice I usually prefer to locate them at the position of the holes, 66, indicated in dotted lines in Figure 8. It may be noted that since the cores, 21 and 41, of the field coils are clamped to the faces of the field plates, it is possible to arrange them on the opposing faces of said plates, thus bringing the coils approximately into vertical alignment with each other, so that they occupy substantially the space between a common pair of parallel planes, and keep within the axial dimension of the motor parts assembled on the shaft, 7.

It should be understood that the novel features of the synchronous motor herein described may be utilized either with or without a starting motor,—that is, such a synchronous motor may be arranged to be manually started, if desired. A simple adaptation of this same motor to manual starting is illustrated in Figures 10 and 11, which may be assumed to illustrate a motor designed for driving a clock train like that shown in Figure 2, but well adapted for a variety of other purposes.

Externally the motor closely resembles that shown in Figure 2, but the field coil, 40, of the starting motor is of course omitted, and the plate shown at 72 is not a field plate but merely serves as a filler in the assembly of the synchronous motor field plate, 22, with the annular wall, 60, and end plates, 61. The depending portion, 73, of the plate, 72, is utilized for anchoring the motor by means of bolts, 6, to the frame of any mechanism which it is designed to drive, a fragment of such frame being indicated at 74.

The shaft, 70, is provided with a knurled hub or knob, 75, for convenient manual engagement in starting the motor by simply spinning the shaft, 70, at a speed as near "synchronous" as the operator can estimate, and preferably a little above that speed. Between the enclosing end plates, 77, the shaft carries a rotor disk, 27, exactly similar to that of Figures 5 and 6, fitted with spaced driving pins, 34, and notched to cooperate with the field plates, 26. The shaft also carries a coil spring member, 30, with its yielding arm, 29, extending between the pins, 34, and 35. And in place of the rotor disk, 47, of the non-synchronous motor a fly-wheel disk, 78, may be secured fast to the shaft simply to add to its inertia, and thus facilitate manual starting of the motor.

It has been noted that when small motors of the synchronous type are employed in continuous service, as for driving clocks, they become noisy after a time due to the wear of the journal bearings of the rotor,—probably because of the tendency of the relatively light rotor to vibrate in response to alternations of the electric current. To overcome this tendency in my motor I prefer to employ a bearing bushing of the type shown in detail in Figure 12, in which the bore, 80, is intersected by a transverse bore or channel, 81, in which a take-up plunger, 82, is guided for radial movement with its inner end in contact with the shaft, 70. Yielding means, such as a flat spring, 83, is arranged to exert a light pressure against the opposite end of the plunger, this being preferably the upper end in the normal positioning of the mechanism. Thus as the bore, 80, of the bearing wears larger the shaft, 70, will be pressed against the lower side of the bore and maintained in contact therewith during operation of the motor, thus preventing the shaft from vibrating and chattering in the enlarged bore of the bearing, and eliminating the noise which has heretofore been incident to the operation of this type of motor.

It will be understood that the specific structures shown and described herein are mainly illustrative of the principles of my invention, which are susceptible of embodiment in a variety of equivalent forms. Therefore, I do not wish to be limited to the particular devices herein shown and described, except to the extent indicated by the scope of the appended claims.

I claim:

1. In combination with a load, a self-starting induction motor having its rotor positively coupled to said load, and a synchronous motor including a rotor loose on the shaft of the self-starting motor; a yieldable arm anchored to said shaft extending radially adjacent the rotor of the synchronous motor, and spaced abutments on said rotor between which said arm extends for limited play, and switching means arranged for energizing said motors alternatively.

2. In the combination defined in claim 1, said radial arm extending from a coil which encircles the shaft, and means on the shaft by which the opposite end of said coil is anchored thereto.

3. In combination with a load, a synchronous motor for driving it comprising a shaft geared to the clock load, a rotor disk loose on the shaft; a field winding and a field plate having poles associated with the rotor, and a starting motor comprising a rotor fast on said shaft, with a separate field winding and field plate with its poles disposed in operative relation to said rotor; a source of alternating current and a switch device normally connecting the first mentioned field therewith, said switch device including means for breaking such connection and establishing connection between the source of current and the second field winding for temporarily actuating the rotor which is fast on the shaft, together with a yielding mechanical connection between said shaft and the first mentioned rotor providing limited angular play of the latter on the shaft, and serving to initiate rotation of said rotor which continues in response to the energizing of the first field when the switch is returned to normal position.

4. In combination, a synchronous motor, a non-synchronous motor and a load to which the latter is positively coupled for driving it, together with a lost motion drive connection between the rotor of the synchronous motor and the load and switching means arranged for energizing the non-synchronous motor to start the load, and adapted for transferring the energy supply to the synchronous motor for maintaining the drive.

5. A combined synchronous motor and self-starting induction motor having a common shaft with the rotor disk of the self-starting motor fast thereon, the rotor of the synchronous motor being loosely mounted on the shaft and axially spaced from the other rotor; a field plate for each motor extending substantially in the plane of its rotor disk, and a field coil associated with each plate, each coil being wound about a core which is clamped to the legs of the field plate at one side of the plane thereof, said coils being thus secured to the opposed faces of the field plates, whereby the coils are contained approximately between the same pair of parallel planes, and a driving connection on the shaft for transmitting motion between said shaft and the rotor of the synchronous motor, said driving connection being accommodated in the space between said rotors.

6. In combination, a self-starting induction motor having its rotor positively coupled to a load, a synchronous motor including a rotor loose on the shaft of the self-starting motor, a lost motion drive connection between the rotors of said motors, and means for connecting an alternating current supply selectively to either of said motors.

7. In combination, a self-starting induction motor having its rotor positively coupled to a load, and a synchronous motor including a rotor loose on the shaft of the self-starting motor, a yieldable arm anchored to said shaft extending radially adjacent the rotor of the synchronous motor, and spaced abutments on said rotor between which said arm extends for limited angular play, together with switching means arranged for energizing said motors alternatively.

8. In combination a self-starting induction motor having its rotor positively coupled to a load, a synchronous motor including a rotor loose on the shaft of said self-starting motor, a yielding drive connection between the rotors of said motors, and means for connecting an alternating current supply selectively to either of said motors.

9. In an alternating current motor including a rotor and shaft supported in bearings for rotation and characterized by being of relatively light weight with respect to the strength of the field flux operating to rotate said elements, means to prevent transverse vibration or "chattering" of the shaft within its bearings due to flux reversals, comprising a member arranged to exert a yielding force upon the shaft transversely thereof and of a magnitude sufficient to maintain said shaft in contact with one wall of its supporting bearing.

10. In an alternating current motor including a rotor and shaft supported in bearings for rotation and characterized by being of relatively light weight with respect to the strength of the field flux operating to rotate said elements, means to prevent transverse vibration or "chattering" of the shaft within its bearings due to flux reversals, comprising a plunger freely slidable in a transverse bore provided in at least one of the shaft bearings, and resilient means engaging said plunger and yieldingly urging the same against the shaft with sufficient force to maintain the shaft against one wall of the bearing.

11. In combination, a synchronous motor, a non-synchronous motor and a load to which the latter is positively coupled for driving it, together with a lost motion drive connection between the rotor of the synchronous motor and the load and switching means including a yielding member normally connecting the synchronous motor in circuit with an alternating current supply and movable to temporarily shift the current supply to the non-synchronous motor.

12. In combination, a synchronous motor, a non-synchronous motor and a load to which the latter is positively coupled for driving it, together with a lost motion drive connection between the rotor of the synchronous motor and the load and switching means including a switch member biased to normally connect the synchronous motor in circuit with an alternating current supply and movable to temporarily shift the current supply to the non-synchronous motor.

MARTIN J. HANSON.